(12) United States Patent
Baker

(10) Patent No.: US 10,102,688 B2
(45) Date of Patent: Oct. 16, 2018

(54) WIRELESS DATA SYSTEM FOR MEASURING RELATIVE MOTION OF TRANSMISSION COMPONENTS

(71) Applicant: Douglas Baker, Ypsilanti, MI (US)

(72) Inventor: Douglas Baker, Ypsilanti, MI (US)

( * ) Notice: Subject to any disclaimer, the term of this patent is extended or adjusted under 35 U.S.C. 154(b) by 74 days.

(21) Appl. No.: 15/209,910

(22) Filed: Jul. 14, 2016

(65) Prior Publication Data

US 2017/0018122 A1 Jan. 19, 2017

Related U.S. Application Data

(60) Provisional application No. 62/192,589, filed on Jul. 15, 2015.

(51) Int. Cl.
| | | |
|---|---|---|
| *G01M 17/00* | (2006.01) | |
| *G06F 7/00* | (2006.01) | |
| *G06F 19/00* | (2018.01) | |
| *G07C 5/00* | (2006.01) | |
| *G07C 5/08* | (2006.01) | |
| *G01B 11/14* | (2006.01) | |
| *H04W 4/70* | (2018.01) | |
| *B60W 50/02* | (2012.01) | |
| *G01D 11/00* | (2006.01) | |

(52) U.S. Cl.
CPC ............. *G07C 5/008* (2013.01); *B60W 50/02* (2013.01); *G01B 11/14* (2013.01); *G01D 11/00* (2013.01); *G07C 5/085* (2013.01); *G07C 5/0808* (2013.01); *H04W 4/70* (2018.02)

(58) Field of Classification Search
CPC ...... G01B 11/14; G07C 5/008; G07C 5/0808; G07C 5/085; H04W 4/005
USPC ........................................................ 701/33.4
See application file for complete search history.

(56) References Cited

U.S. PATENT DOCUMENTS

| 6,029,787 | A | * | 2/2000 | Reik | F16D 13/585 |
| | | | | | 192/111.19 |
| 2006/0185445 | A1 | * | 8/2006 | Delcher | F01D 21/003 |
| | | | | | 73/862.325 |
| 2007/0131513 | A1 | * | 6/2007 | Ha | F16D 27/004 |
| | | | | | 192/90 |
| 2008/0291014 | A1 | * | 11/2008 | Chigusa | G07C 5/008 |
| | | | | | 340/540 |
| 2013/0093293 | A1 | * | 4/2013 | Price | H02K 11/0021 |
| | | | | | 310/68 B |
| 2014/0274556 | A1 | * | 9/2014 | Fujii | F16H 61/04 |
| | | | | | 477/79 |
| 2015/0308998 | A1 | * | 10/2015 | Suzuki | B60L 11/1881 |
| | | | | | 73/31.05 |
| 2016/0176289 | A1 | * | 6/2016 | Ganchev | B60K 17/02 |
| | | | | | 180/247 |
| 2017/0212513 | A1 | * | 7/2017 | Iida | G05D 1/0061 |
| 2017/0267097 | A9 | * | 9/2017 | Ganchev | B60K 17/02 |

* cited by examiner

*Primary Examiner* — Harry Y Oh

(74) *Attorney, Agent, or Firm* — John S. Artz; Dickinson Wright PLLC

(57) ABSTRACT

The aspects of the present disclosure may provide a wireless data system for a mechanical power transmission. The wireless data system may be configured to measure the displacement between two or more components within a powertrain driveline, where one or more of the components are in relative motion.

16 Claims, 9 Drawing Sheets

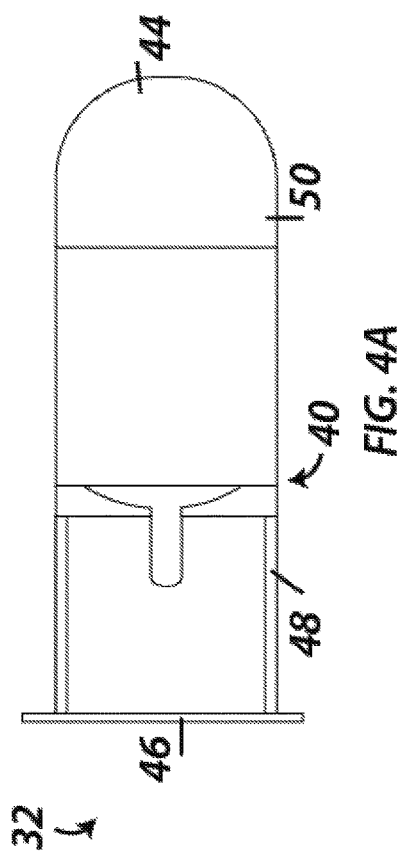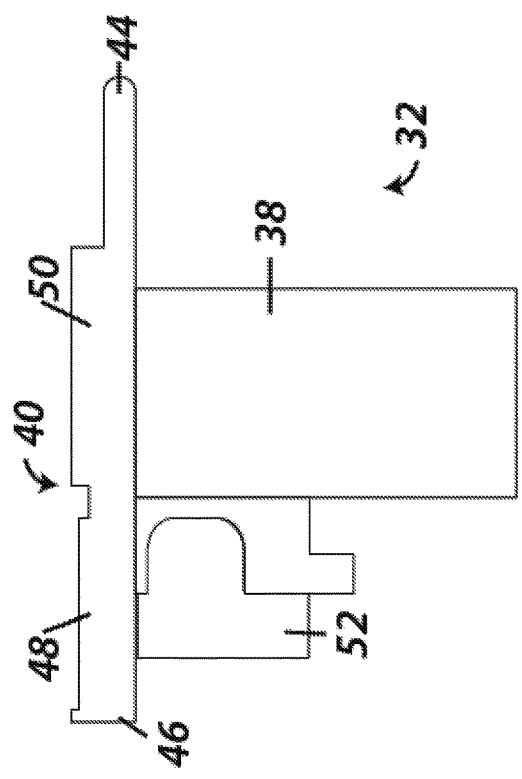
FIG. 4A
FIG. 4B

WIRELESS DATA SYSTEM FOR MEASURING RELATIVE MOTION OF TRANSMISSION COMPONENTS

CROSS REFERENCE TO RELATED APPLICATION

This application claims the benefit of U.S. Provisional Application No. 62/192,589 filed on Jul. 15, 2015 and is hereby incorporated therein.

FIELD OF THE DISCLOSURE

The present disclosure generally relates to a wireless data system for a mechanical power transmission and in particular, to a wireless data system for measuring a change in distance or motion of two or more components within a vehicle driveline, where one or more components are in relative motion.

BACKGROUND OF THE DISCLOSURE

In vehicles, it is important to monitor the conditions or status of various components along the vehicle driveline to ensure each are working properly at any given time, especially since the components may encounter different elements and forces while the vehicle is operating. Specifically, one or more components may experience varying torques, temperatures, and wear based on the position and dynamic nature of each component. However, for that reason, it is difficult to measure/monitor the condition or status of the components as certain factors do not allow additional measurement equipment along the driveline. Such factors may include limited space and placement around the driveline components and harsh environmental elements such as substantial organic debris.

This is problematic for all vehicles and is especially problematic for racing or high performance vehicles and racing teams that need operational data to properly tune the vehicle driveline for optimal performance and to continue to operate the vehicle safely and without damage to the vehicle.

To address this problem, devices were created to determine and measure the condition or status of components found along the powertrain driveline. Such devices include devices to measure push rod displacement, temperature sensors, wear sensors for monitoring brake or clutch lining, torque sensors, and the like. However, shortcomings and deficiencies still exist with such devices. For instance, the devices are limited in their ability to monitor/measure operational data from each component. Currently, these devices are made to measure a single feature of one component and are unable to measure and address all elements experienced by one or multiple components along the driveline. The devices also do not measure or store data in real-time to allow for adjustments or analysis for present and future use by the operator or a user associated with the vehicle. Additionally, the devices are limited in placement around the components and are not protected from harsh environmental elements such as debris and a wide range of temperatures.

There is a need for a wireless data system for a mechanical power transmission that can measure the change in distance or motion of two or more components in the vehicle driveline, where one or more components are in relative motion, as well as address the deficiencies of current devices.

SUMMARY OF THE DISCLOSURE

The aspects of the present disclosure provide a wireless data system for a mechanical power transmission along a powertrain driveline and a method of operating a wireless data system for a mechanical power transmission along a powertrain driveline.

An aspect of a wireless data system may include a wireless measurement circuit. The wireless measurement circuit may include a proximity sensor configured to measure a displacement, distance, or motion between two or more components within a vehicle's driveline, where one or more of the components are in relative motion.

An aspect of the present disclosure may include a wireless data system for a power transmission of a vehicle driveline having at least two components. The wireless data system may include a sensor for detecting operational data indicating displacement between at least two components, a wireless data acquisition board in communication with the sensor which receives and records the operational data from the sensor, a memory module in communication with the wireless data acquisition board for storing the operational data, and a controller in communication with the wireless data acquisition board and the memory module for analyzing the operational data. At least one of the two or more components are in relative motion.

An aspect of a method of operating a wireless data system for a mechanical power transmission along the driveline of a vehicle may include measuring a distance or motion of two or more components using a proximity sensor, where one or more of the components are in relative motion.

The aspects of the present disclosure provide various advantages. For example, the wireless data system operates and transmits data in real-time and also has the ability to store data taken from the powertrain components for future analysis. The wireless data system is small and is easy to service because of its size. Additionally, the wireless data system and in particular, the wireless measurement circuit is protected by the housing from various environmental elements such as extreme temperature and debris surrounding the rotary components.

BRIEF DESCRIPTION OF THE DRAWINGS

Other aspects of the present disclosure will be readily appreciated, as the same becomes better understood by reference to the following detailed description when considered in connection with the accompanying drawings wherein:

FIGS. 4A and 4B are examples of illustrations of a housing of a wireless data system in accordance with an aspect of the present disclosure;

DETAILED DESCRIPTION OF THE PRESENT DISCLOSURE

Figure 1:
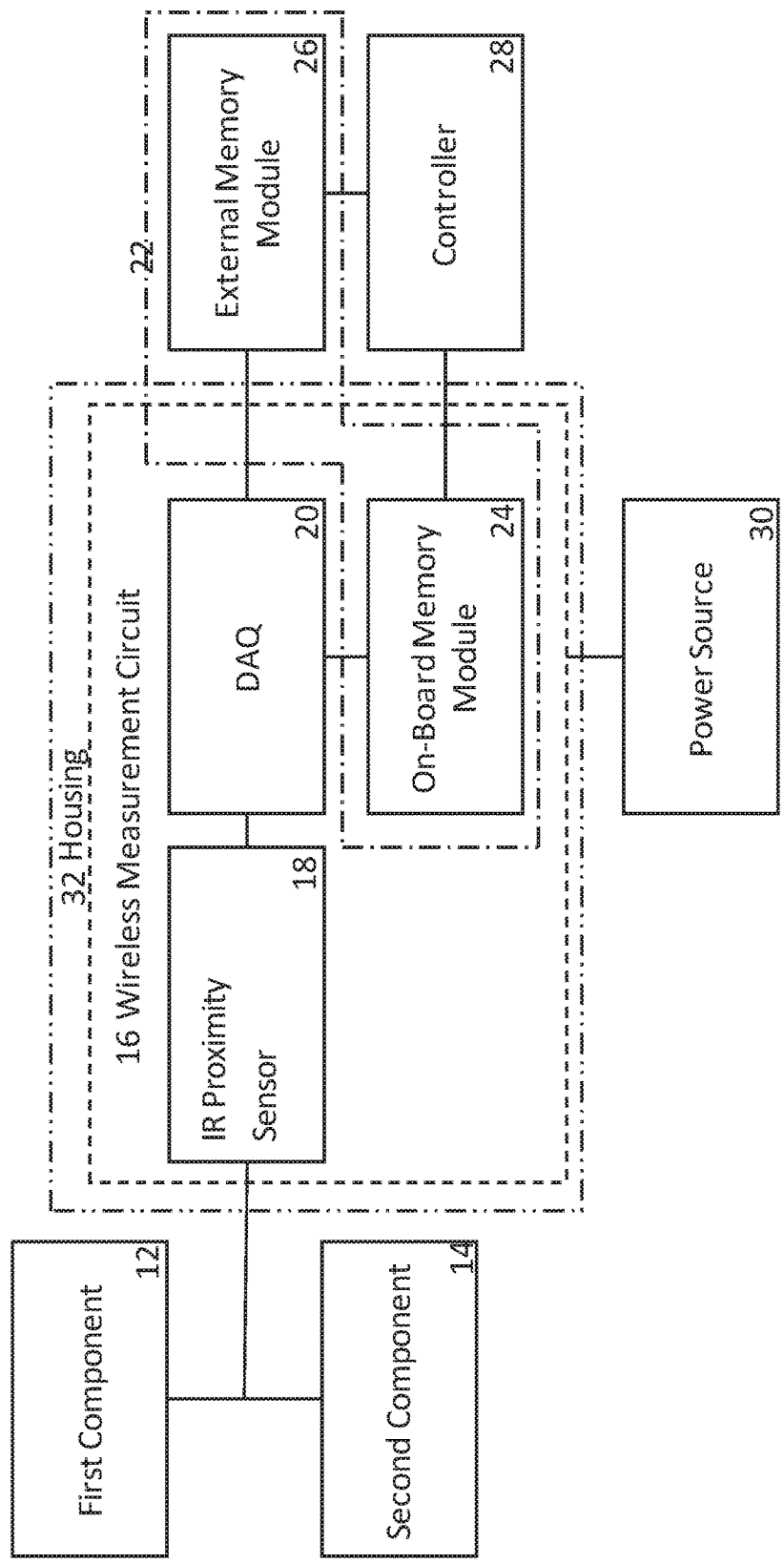
FIG. 1 is a block diagram of a wireless data system in accordance with an aspect of the present disclosure.

Detailed aspects of the present disclosure are provided herein; however, it is to be understood that the disclosed aspects are merely exemplary and may be embodied in various and alternative forms. It is not intended that these aspects illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure as illustrated and described with reference to any of the Figures may be combined with features illustrated in one or more other Figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations. While examples of the disclosure have been illustrated and described, it is not intended that these examples illustrate and describe all possible forms of the disclosure. Rather, the words used in the specification are words of description rather than limitation, and it is understood that various changes may be made without departing from the spirit and scope of the disclosure. Additionally, the features and various implementing embodiments may be combined to form further examples of the disclosure.

The aspects disclosed herein provide a wireless data system for a mechanical power transmission. The wireless data system may be configured to measure the distance or motion between two or more components within a driveline with one or more of the components being in relative motion. The wireless data system may use a proximity sensor to measure distance or motion. The wireless data system may also be configured to wirelessly transmit the measurement of distance or motion to a control for analysis using radio frequency (RF) transmission. The measurement of distance or motion may be used to determine various conditions such as, but not limited to, wear, temperature experienced, and torque applied to the components while the system is operating.

It will be appreciated by one skilled in the art that the present disclosure describes a wireless data system for a mechanical power transmission, which may utilize a proximity sensor to measure the distance or motion of two or more components within a driveline, where one or more component is in relative motion. In other words, one or more of the components may be rotating or axially moving relative to other components while the measurements are taken. It will be further appreciated by one skilled in the art that the two or more components may include any component within the powertrain driveline. For example, a clutch and driveshaft, U-joint, valve, spring, and the like. Additionally, such measurements may be used to analyze various conditions or status of the component including, but not limited to, wear, temperature surrounding the components, torque applied, and the like.

FIG. 1 is a block diagram of a wireless data system 10 in accordance with the present disclosure. The wireless data system 10 may be configured to measure a change in distance or motion between two or more components 12, 14 within a powertrain driveline, where one or more components 12, 14 may be in relative motion. In other words, one or more of the components 12, 14 may be rotating at different speeds or have varying degrees of axial motion and the wireless data system 10 can measure the displacement between the rotating component and a stationary component or a second rotating component. The components 12, 14 may be any components 12, 14 within the vehicle's driveline and the components 12, 14 may or may not be coaxial to one another. Additionally, the vehicle may be any kind of vehicle, including, but not limited to, a drag racing vehicle with a mechanical power transmission. The measurements may be used to analyze various conditions experienced by the vehicle components 12, 14 during operation of the vehicle.

The wireless data system 10 may include a wireless measurement circuit 16 which is designed to measure the distance or motion between the components 12, 14 and may be designed to be placed adjacent to the component. The wireless measurement circuit 16 may include a proximity sensor 18 to measure distance or motion between components 12, 14, a wireless data acquisition (DAC) board 20 for receiving and recording measurement data from the proximity sensor 18, and a memory module 22 for storing the measurement data, such as an on-board memory module 24 or an external memory module 26. The external memory module 26 may be in communication with the wireless measurement circuit 16 when the on-board memory module 24 is not available or not included within the wireless measurement circuit 16. According to a further aspect, the memory module 22 may be in communication with a controller, which may be used to analyze the measurements of distance or motion experienced by the components 12, 14.

The proximity sensor 18 may be any type of proximity sensor such as, but not limited to, an infrared (IR) proximity sensor or a magnetic field sensor. Further, the sensor 18 may be a micro-electromechanical (MEMs) IR sensor or magnetometer. As discussed above, the IR proximity sensor 18 may be configured to measure or detect a change in distance or motion of two or more components 12, 14, where one or more components 12, 14 are in relative motion. In other words, the IR proximity sensor 18 can measure the changing displacement between two or more components 12, 14 where one or more components 12, 14 are rotating components. The other component may be stationary. The proximity sensor 18 may be configured to measure axial displacement, tangential displacement, radial displacement, and/or a combination thereof. However, the components 12, 14 may or may not be coaxial within the vehicle's driveline. The IR proximity sensor 18 uses infrared light to detect the displacement between the components 12, 14. Specifically, the sensor 18 detects infrared radiation emitting or reflecting off of the components 12, 14 to aid in determining the displacement or distance there between. As such, data indicative of the displacement is obtained. The sensor 18 may additionally measure ambient light to further improve the accuracy of the measurement.

The wireless DAC board 20 may be in communication with the proximity sensor 18 and may be configured to receive and/or record the data indicative of displacement between two or more components 12, 14, where one or more components 12, 14 are in relative motion. The wireless DAQ board 20 may monitor and/or record the change in distance or motion of the components 12, 14 after a predetermined variable has been detected or triggered. The predetermined variable may be time, such as a number of seconds passed after the vehicle has taken off, or may be a certain amount of displacement or distance between the components 12, 14, which triggers recording once the displacement is reached. The wireless DAQ board 20 may be further configured to create a profile of received or recorded measurements to provide an accurate range of measurements or average measurement of the change in distance or motion of the components 12, 14.

The data or measurements may then be stored by the wireless DAQ board 20. This may occur after the predetermined variable occurs as discussed above or may continuously be stored throughout operation. Specifically, the data or measurements may be stored in the memory module 22, for instance the on-board memory module 24. The memory module 22 can be in communication with the wireless DAC board 20 and may be located within the wireless measurement circuit 16 or located within another location within the vehicle such as, but not limited to, a USB device within the vehicle. Alternatively, in another aspect, data or measurements may be stored to the external memory module 26, which may be located away from the vehicle entirely. For instance, the wireless DAQ board 20 may transmit measurements to a controller or computer 28 which has its own memory module 22 and is located away from the vehicle. Such transmission of data or measurements allows for real-time analysis during operation or for future analysis after operation of the vehicle has ceased.

The wireless measurement circuit 16 may further be connected to a power source 30. The power source 30 may be a low-powered battery or a low-power harvesting system. Such harvesting system may use an induction system, a thermal system, or a combination thereof to produce power. It will be appreciated by one skilled in the art that use of a MEMs IR proximity sensor 18, a wireless DAQ board 20, and a power source 30 operates under low voltage and current draw, and is energy efficient.

The wireless data system 10 as described above may be surrounded by a protective housing 32, which allows the wireless data system 10 to be placed within or close to the components 12, 14 along the vehicle's driveline. Additionally, the housing 32 may be designed to protect the sensor 18 and the wireless measurement circuit 16 from environmental elements and varying temperature. The housing 32 will be described in more detail below.

Figure 2:
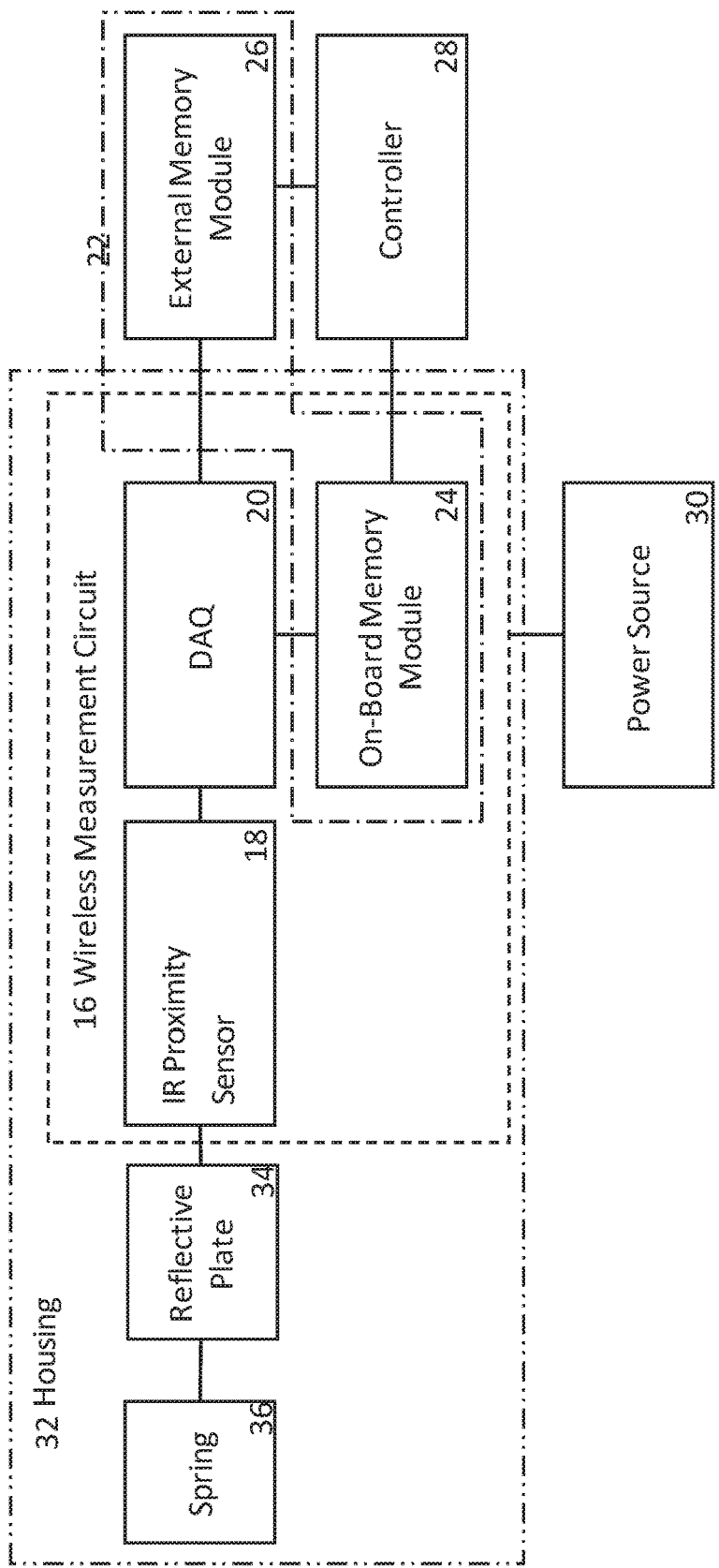
FIG. 2 is another aspect of a block diagram of a wireless data system in accordance with an aspect of the present disclosure.

FIG. 2 is a block diagram of another aspect of a wireless data system 10 in accordance with the present disclosure. In addition to the elements disclosed in FIG. 1, FIG. 2 may include a reflective plate 34 to be used with the IR proximity sensor 18. Specifically, the reflective plate 34 may be disposed adjacent to the IR proximity sensor 18. The reflective plate 34 may be made of a metallic material. In one aspect, the reflective plate 34 may be a washer.

A spring 36 may also be used in combination with the reflective plate 34. According to one aspect of the present disclosure, the reflective plate 34 may be disposed on the spring 36. The spring 36, reflective plate 34, and measurement circuit 16 may be surrounded by the protective housing 32. In operation, the IR proximity sensor 18 detects light reflecting from the reflective plate 34 to measure the displacement between components 12, 14. It is important to understand that the spring 36 is not an integral factor to measuring the distance between the components 12, 14. Instead, the spring 36 may be used as a device to hold the wireless data system 10 in place or to support the reflective plate 34.

Figure 3:
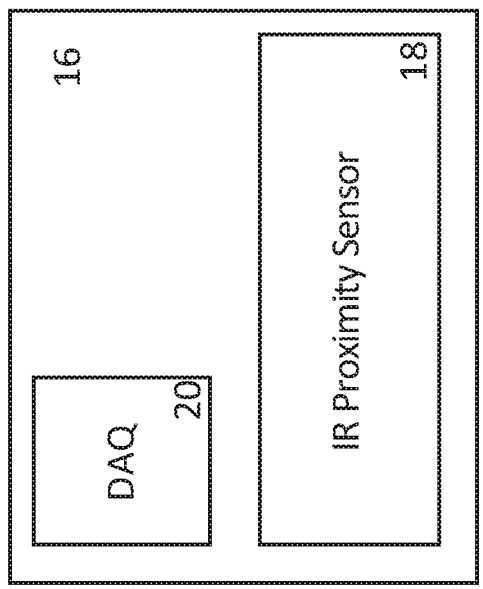
FIG. 3 is an illustration of a wireless measurement circuit of a wireless data system in accordance with an aspect of the present disclosure.

FIG. 3 is an illustration of an example wireless measurement circuit 16 of a wireless data system 10 in accordance with an aspect of the present disclosure. As described in FIG. 1, the wireless measurement circuit 16 may include an IR proximity sensor 18 configured to measure or detect distance or motion between two or more components 12, 14, where one or more of the components 12, 14 are in relative motion. A wireless DAQ board 20 is in communication with the IR proximity sensor 18. The wireless DAQ board 20 may be configured to receive and/or record the measurements obtained or detected by the IR proximity sensor 18. The measurements may be received and recorded after a variable reaches a pre-determined trigger point. Additionally, the wireless DAQ board 20 may be configured to monitor and create a recorded profile to provide an accurate range of measurements or an average measurement indicative of distance or motion between the components 12, 14. The wireless DAQ board 20 may further store the measurements or data obtained by the IR proximity sensor 18 on a memory module (not shown). The memory module 22 may be the on-board memory module 24 or the external memory module 26 and may be in communication with or a part of a controller or computer 28 as discussed above. Monitoring and storing may occur after a variable meets or continues to meet a predetermined condition.

FIGS. 4A and 4B are examples of illustrations of a housing 32 of a wireless data system 10 in accordance with an aspect of the present disclosure. The housing 32 may be designed to enclose and protect the wireless measurement circuit, spring, and reflective plate (not shown) from harsh environmental elements and various temperatures experienced by the mechanical power transmission. The housing 32 may be further configured to attach to any component within the driveline of the mechanical power transmission.

The housing 32 may have a hollow cylindrical body 38 for receiving the spring (not shown) and for attachment to one or more of the components 12, 14. A flange 40 may extend outwardly from one end of the hollow cylindrical body 38 and may have an elongated shape. The flange 40 may also have a rounded end 44 and a square-shaped end 46 with the hollow cylindrical body 38 being disposed at the rounded end 44. For example, the housing 32 may form an L-like shape. However, it will be appreciated by one skilled in the art that the flange 40 may have any shape conducive for placement within the driveline of the mechanical power transmission.

The flange 40 may have a lip 48 for receiving or holding the wireless measurement circuit 16 and the reflective plate 34. Additionally, the flange 40 may be configured to receive a lid 50 to protect the wireless measurement circuit 16 from environmental elements such as debris and/or extreme temperatures. The lid 50 can be made in one or more pieces and may be further configured to slide over the flange 40. The housing 32 may be made of a polymeric material such as plastic and/or metal or a combination of both. A support member 52 may be disposed between the hollow cylindrical body 38 and the flange 40 to provide extra support to the flange 40. Furthermore, the hollow cylindrical body 38, the flange 40, and the support member 52 may be formed as one piece. The housing 32 may be designed to rotate with the rotating component being measured.

Figure 5:
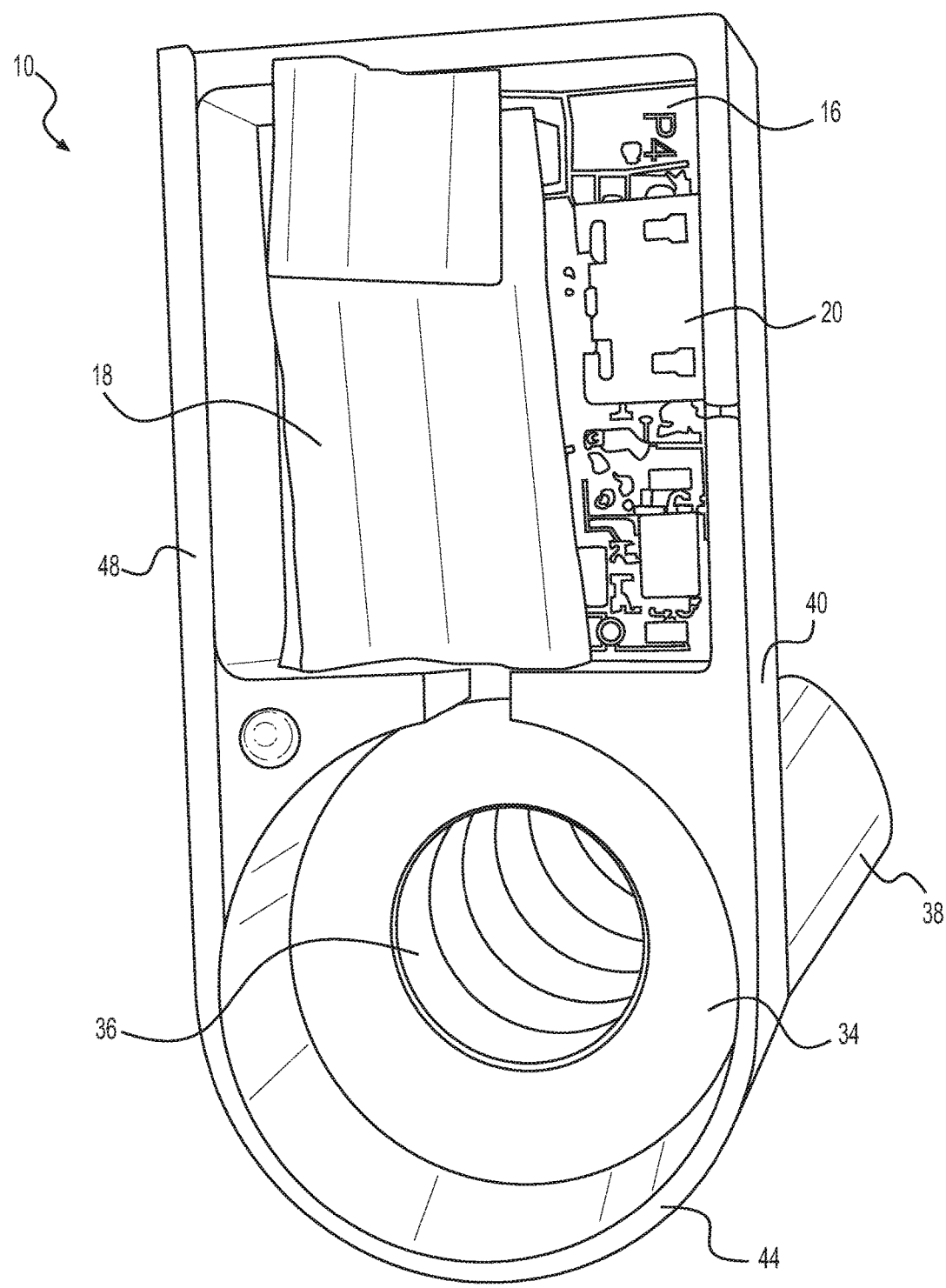
FIG. 5 is an example of an illustration of a wireless data system in accordance with an aspect of the present disclosure.

With respect to FIG. 5, an example of an illustration of a wireless data system 10 in accordance with an aspect of the present disclosure is shown. Specifically, the wireless measurement circuit 16, the reflective plate 34, and the spring 36 are shown disposed within the housing 32 described in FIGS. 4A and 4B. The wireless data system 10 may include the wireless measurement circuit 16 with the IR proximity sensor 18 and the wireless DAQ board 20 disposed in the square-shaped end 46 of the flange 40. The reflective plate 34 may be disposed adjacent to the wireless measurement circuit 16 in the rounded end 44 of the flange 40. The reflective plate 34 may be further disposed on the spring 36.

Figure 6:
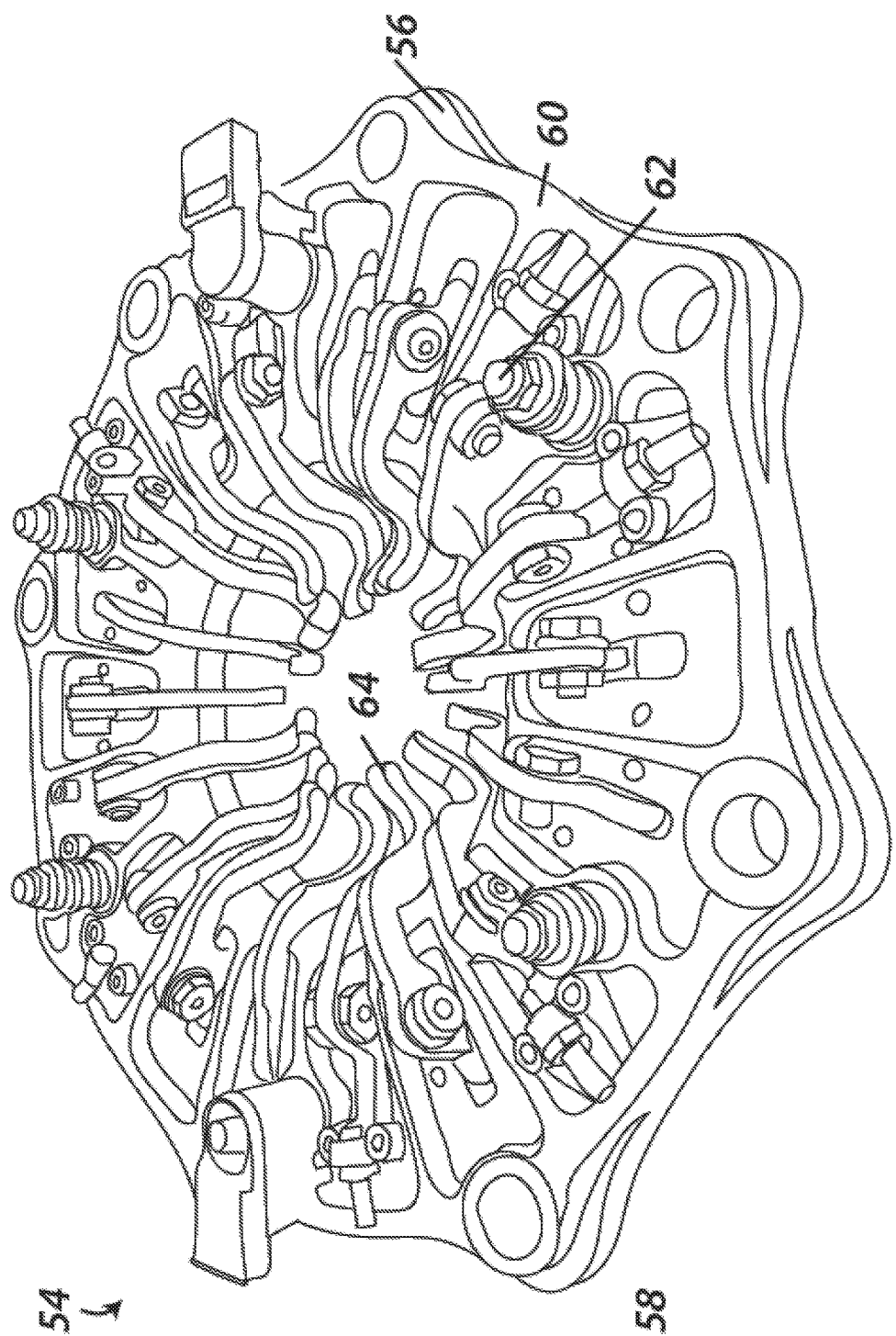
FIG. 6 is an example of a clutch to be used with the wireless data system in accordance with an aspect of the present disclosure.

As described above, the wireless data system 10 may be disposed along the vehicle's driveline and may be used to measure the change in distance, motion, or displacement between two or more components 12, 14, where one or more of the components 12, 14 are in relative motion. An example of one of the components 12, 14 may be a clutch, as shown in FIG. 6, and the other component may be a drive shaft. The clutch 54 may be a multi-plate clutch. For example, the clutch 54 may be a five-disc dry clutch. Such clutch 54 may be the link between the vehicle engine and a locked rear end. The vehicle may be any type of vehicle such as, but not limited to a drag racing vehicle, industrial equipment, or the like. In one aspect of the present disclosure, the clutch 54 may be a part of a drag racing vehicle. The clutch 54 may include a flywheel (not shown) for attachment to the engine, one or more clutch plates 56 adjacent to the flywheel, one or more floaters 58 adjacent to the clutch plates 56, a pressure plate 60 disposed over the clutch plates 56 and the floaters 58, a plurality of stud bolts 62 affixed to the back of the pressure plate 60, and a plurality of levers 64 also affixed to the back of the pressure plate 60. As described above, the clutch 54 can regulate wheel spin by gradually engaging and slipping as the vehicle operates. In operation, the clutch 54 uses the plurality of levers 64 to apply force through the pressure plate 60 to engage and compress the clutch plates 56 and floaters 58 together. Proper tuning for engagement is key for the vehicle. If engagement occurs too quickly, the tires will spin. If the clutch engages too slowly, the car will not accelerate as fast as required or as possible. Engagement causes issues during operation. As the engine spins faster, great forces are applied to the clutch 54, which may be greater forces than the clutch 54 can handle. The motion between the stud bolts 62 and levers 64 are a direct indication of the motion of the pressure plate 60 and which is a direct indication of clutch wear.

Figure 7:
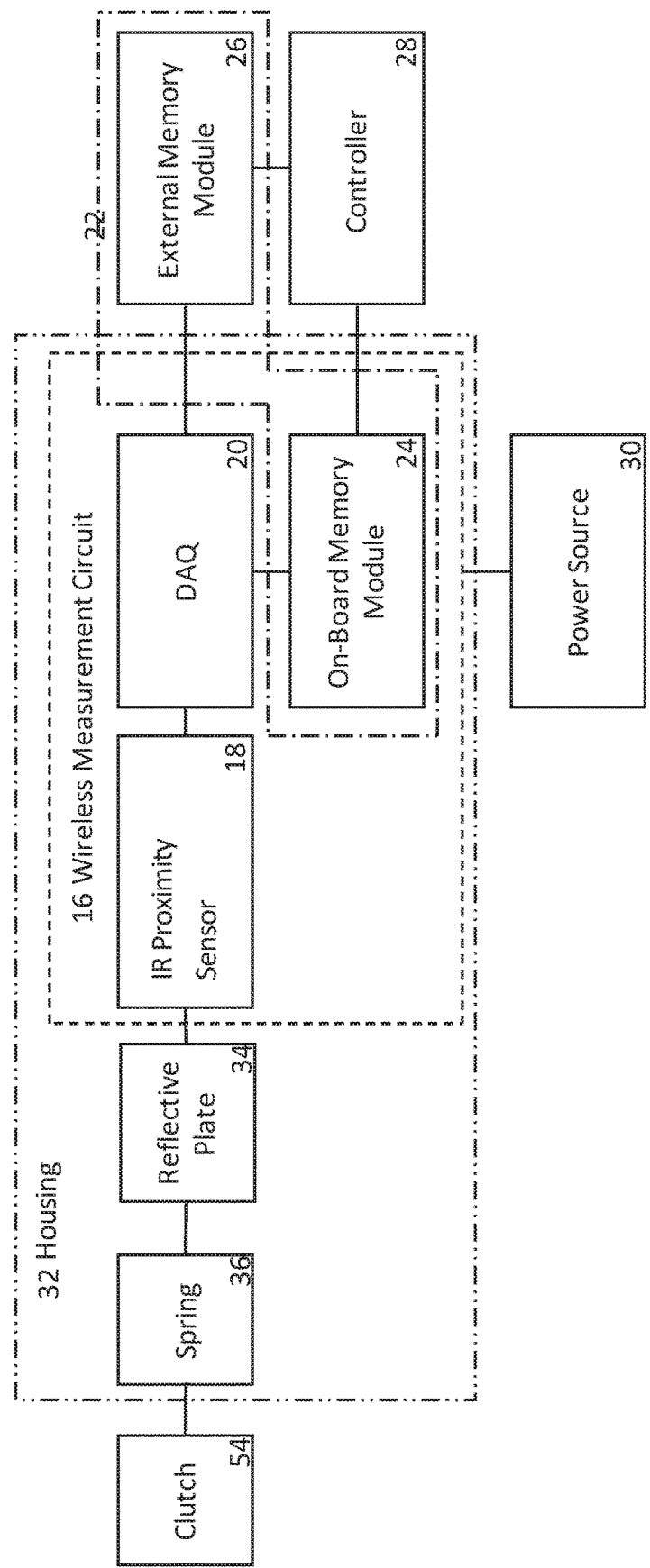
FIG. 7 is a block diagram of a wireless data system engaging a clutch in accordance with an aspect of the present disclosure.

FIG. 7 is an example of a block diagram of a wireless data system 10 engaging a clutch 54, which is shown in FIG. 6. More specifically, FIG. 6 includes the components 12, 14 of the block diagram of FIG. 1 and shows the interaction with the clutch 54. The wireless data system 10 includes a wireless measurement circuit 16 with an IR proximity sensor 18 and a wireless DAQ board 20 in communication with the IR proximity sensor 18, and a memory module 22 such as an on-board memory module 24 and/or an external memory module 26 which may be in communication with the wireless DAQ board 20. The wireless data system 10 may also include a power source which may be connected to the wireless measurement circuit 16. The housing 32 may surround the wireless measurement circuit 16, and a support spring 36 which is used to support a reflective plate 34, which is also surrounded by the housing 32. The clutch 54 of FIG. 6 may also be in contact with the spring 36.

In operation, the wireless measurement circuit 16 and specifically, the IR proximity sensor 18 may be configured to measure or detect the displacement, distance, or motion between the clutch 54 and a pressure plate 60. In particular, the IR proximity sensor 18 may use infrared light reflecting off of the reflective plate 34 to determine the displacement between the two components 12, 14. Once the displacement, distance, or motion is detected, the data is transmitted to the wireless DAQ board 20, which records and stores the data in memory for real-time and future use. In this instance, the wireless data system 10 measures the rate of engagement experienced by the clutch 54 and clutch plate 60 as the vehicle is operating, which results in clutch wear.

Figure 8:
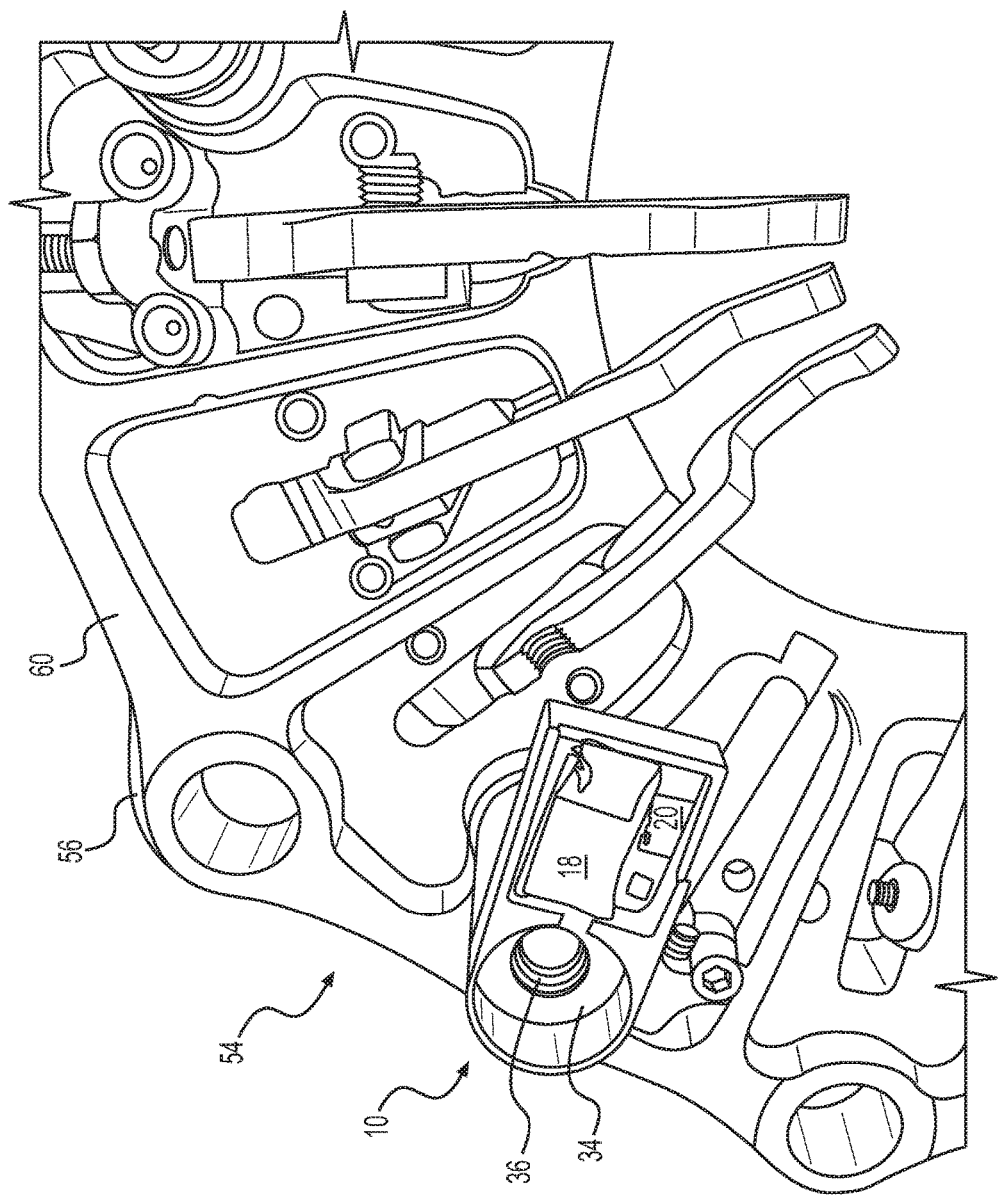
FIG. 8 is an illustration of a wireless data system disposed on a clutch in accordance with an aspect of the present disclosure.

FIG. 8 is an example of an illustration of a clutch 54 with a wireless data system 10 in accordance with an aspect of the present disclosure. In particular, FIG. 8 shows the wireless measurement circuit 16, the reflective plate 34, the spring 36, and the surrounding housing 32 disposed on the stud bolt of the pressure plate 60 of the clutch 54. The configuration of the wireless data system 10 may allow the housing 32 with the electronics within to be affixed to one of the components 12, 14. For example, the wireless data system 10 may be attached to the clutch 54 and may spin with the engine shaft. The configuration of housing 32 may also protect the electronics within from environmental elements and temperatures and allow information to be transmitted wirelessly for analysis.

Figure 9:
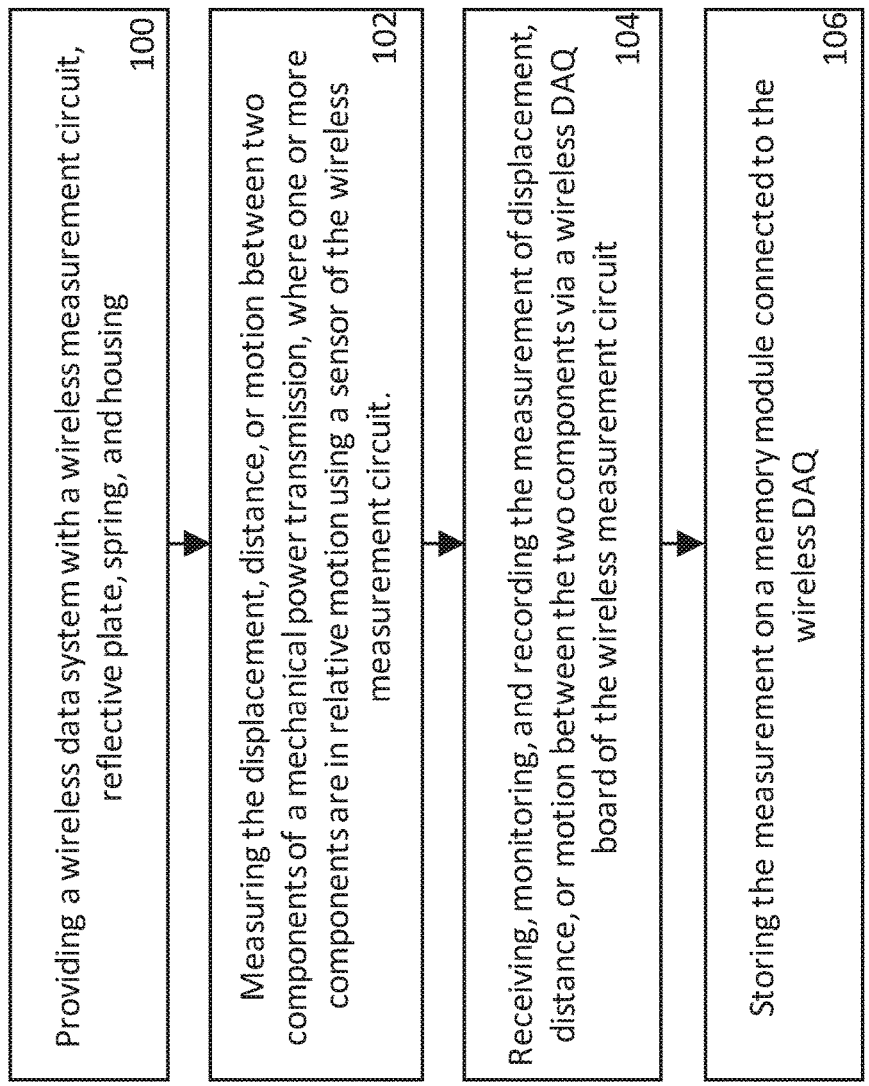
FIG. 9 is a flowchart of a method of operating a wireless data system in accordance with an aspect of the present disclosure.

FIG. 9 is a flowchart of a method of operating a wireless data system in accordance with an aspect of the present disclosure. The method may include providing a wireless data system 100. The wireless data system may have a housing, a spring disposed within the housing, a reflective plate disposed on the spring, and a wireless measurement circuit adjacent to the reflective plate and disposed within the housing. The wireless measurement circuit may have a sensor such as a MEMs IR proximity sensor and a wireless DAQ board. The wireless measurement circuit can also have a memory module. Additionally, the wireless data system may include a clutch of a racing car. The wireless data system may further include two or more components within a vehicle driveline of the mechanical power transmission, where one or more of the components may be in relative motion. For example, the components may include a clutch and an engine shaft. The wireless data system may be configured to measure the displacement, distance, or motion between the components 102 using an IR proximity sensor.

Once the IR proximity sensor detects or measures the distance or motion between the components, the wireless DAQ board may receive, monitor, and record the measurements detected of the distance or motion of the two rotary components 104. Such measurements may be monitored and recorded continuously or may be triggered after a predetermined variable has been detected by the IR proximity sensor. The measurements may be transmitted and received by radio frequency (RF) readings and may be used to determine torque of rotation of the engine shaft, spring compression, clutch wear, and the like.

After the measurements are received, monitored, and recorded 104, the measurements may be transmitted from the wireless DAQ board to a memory module 106 and may be stored in the memory module. The memory module may be an on-board memory module located within the vehicle or may be an external memory module located outside of the vehicle. For instance, the external memory module may include a computer located with the pit crew of a drag racing vehicle. Once the data is transmitted to the memory module, the memory module may be removed or uploaded to an external computer and analyzed using a graphical user interface to determine one or more various conditions that occurred during operation of the vehicle.

It will be appreciated by one skilled in the art that the one or more various conditions may include clutch wear, torque applied, strain, temperature, or any linear measurement. Additionally, it will also be appreciated by one skilled in the art that the wireless measurement circuit and housing may be altered and/or adapted to fit any component in a driveline such as, but not limited to, a crankshaft or flex plate.

What is claimed:

1. A wireless data system for a vehicle driveline having at least two components, the wireless data system comprising:
   an infrared proximity sensor for detecting operational data indicating displacement between the at least two components, wherein the at least two components are selected from a group consisting of a clutch, pressure plate, bolt, driveshaft, U-joint, valve, spring, crankshaft, and flex plate;
   the infrared proximity sensor coupled to one of the at least two components and disposed adjacent to a reflective plate moveable with another of the at least two components and wherein the infrared proximity sensor is configured to detect light reflecting from the reflective plate to measure the displacement between the at least two components;
   a wireless data acquisition board in communication with the infrared proximity sensor, the wireless data acquisition board receives and records the operational data from the infrared proximity sensor;
   a memory module in communication with the wireless data acquisition board for storing the operational data; and
   a controller in communication with at least one of the wireless data acquisition board and the memory module for analyzing the operational data,
   wherein at least one of the at least two components are in relative motion to one another.

2. The wireless data system of claim 1, wherein the at least two components include a clutch and a drive shaft.

3. The wireless data system of claim 1, wherein displacement is at least one of axial displacement, tangential displacement, and radial displacement.

4. The wireless data system of claim 1, wherein the wireless data acquisition board records the operational data obtained by the infrared proximity sensor after a predetermined variable reaches a predetermined trigger value.

5. The wireless data system of claim 4, wherein the predetermined variable is time.

6. The wireless data system of claim 1, wherein the one of the at least two components is a pressure plate of a clutch and the another one of the at least two components is a stud bolt of the clutch and the wireless data system further comprises:
   a spring disposed about the stud bolt; and
   wherein the reflective plate is disposed about the stud bolt and on the spring and moveable relative to the infrared proximity sensor in response to movement of the stud bolt,
   wherein the infrared proximity sensor detects the distance to the reflective plate to determine displacement between the stud bolt and the pressure plate.

7. The wireless data system of claim 6, further comprising:
   a housing enclosing the spring, reflective plate, infrared proximity sensor, and wireless data acquisition board from environmental elements along the vehicle driveline.

8. The wireless data system of claim 1, wherein the infrared proximity sensor and the wireless data acquisition board are a wireless measurement circuit.

9. The wireless data system of claim 8, further comprising:
   a power source connected to the wireless measurement circuit.

10. The wireless data system of claim 8, wherein the power source is a low-power harvesting system using at least one of an induction system and a thermal system to produce power.

11. A wireless data system for a vehicle driveline having at least two components, the wireless data system comprising:
   an infrared proximity sensor disposed along the vehicle driveline for measuring operational data of a displacement between the at least two components within the vehicle driveline, wherein the at least two components are selected from a group consisting of a clutch, pressure plate, bolt, driveshaft, U-joint, valve, spring, crankshaft, and flex plate;
   the infrared proximity sensor coupled to one of the at least two components and disposed adjacent to a reflective plate moveable with another of the at least two components and wherein the infrared proximity sensor is configured to detect light reflecting from the reflective plate to measure the displacement between the at least two components;
   wherein at least one of the at least two components are in relative motion to one another.

12. A method for measuring operational data between at least two components within a vehicle driveline using a wireless data system, the wireless data system includes a wireless measurement circuit having an infrared proximity sensor and wireless data acquisition board and a memory module in communication with the wireless measurement circuit, the method comprising the steps of:
   detecting light reflecting from a reflective plate coupled to one of the at least two components and disposed adjacent to the infrared proximity sensor moveable with another of the at least two components;
   detecting the displacement between the at least two components within the vehicle driveline via the infrared proximity sensor of the wireless measurement circuit,
   wherein at least one of the at least two components are selected from a group consisting of a clutch, pressure plate, bolt, driveshaft, U-joint, valve, spring, crankshaft, and flex plate and are in relative motion to one another.

13. The method of claim 12, wherein the at least two components are a clutch and a drive shaft.

14. The method of claim 12, further comprising:
   transmitting the operational data indicating the displacement between the at least two components to the wireless data acquisition board.

15. The method of claim 14, further comprising:
   recording the operational data on the wireless data acquisition board, and
   transmitting the operational data to and storing the operational data on the memory module.

16. The method of claim 15, further comprising:
   transmitting the operational data to a computer for analysis.

* * * * *